United States Patent
Bone et al.

(10) Patent No.: US 9,668,129 B2
(45) Date of Patent: May 30, 2017

(54) AUTHENTICATION IN A WIRELESS ACCESS NETWORK

(75) Inventors: Nicholas Bone, Thatcham (GB); Peter Howard, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 13/823,580

(22) PCT Filed: Sep. 14, 2011

(86) PCT No.: PCT/GB2011/051721
§ 371 (c)(1),
(2), (4) Date: Aug. 7, 2013

(87) PCT Pub. No.: WO2012/035338
PCT Pub. Date: Mar. 22, 2012

(65) Prior Publication Data
US 2014/0181902 A1    Jun. 26, 2014

(30) Foreign Application Priority Data

Sep. 14, 2010 (GB) .................................. 1015322.9
Sep. 14, 2010 (GB) .................................. 1015323.7

(51) Int. Cl.
*H04W 12/06* (2009.01)
*H04L 29/06* (2006.01)
*H04W 12/12* (2009.01)

(52) U.S. Cl.
CPC ......... *H04W 12/06* (2013.01); *H04L 63/0853* (2013.01); *H04W 12/12* (2013.01)

(58) Field of Classification Search
CPC ......... H04L 63/08; H04L 63/10; H04L 63/20; H04L 29/06; H04L 63/0428
(Continued)

(56) References Cited

U.S. PATENT DOCUMENTS 6,957,060 B1 * 10/2005 Sharp .................... H04M 15/39
                                                       455/410
7,499,888 B1 *  3/2009 Tu .......................... G06Q 20/40
                                                        705/44
(Continued)

FOREIGN PATENT DOCUMENTS

GB    WO 2009/092115    *  7/2009  ............ H04W 12/08
GB    WO2009/092115     *  7/2009
WO    WO 2009/092115 A2    7/2009

OTHER PUBLICATIONS

Ericsson: "Architecture Modifications and Alternatives for Remote Management of USIM Application on M2M Equipment", 3GPP Draft; S3 080163 PCR TR33812 Funcarch, 3rd Generation Partnership Project (3GPP), Mobile Competence Centre; 650,Route Des Lucioles; F-06921 Sophia-Antipolis Cedex; France, vol. SA WG3, No. Sanya; 20080218, Feb. 18, 2008 (Feb. 18, 2008), XP050280533, [retrieved on Feb. 18, 2008] Paragraph [0008].

*Primary Examiner* — Farid Homayounmehr
*Assistant Examiner* — Sanchit Sarker
(74) *Attorney, Agent, or Firm* — Workman Nydegger

(57) ABSTRACT

To allow devices to authenticate to a wide area mobile network when they temporarily do not have a connection to a SIM card and to authenticate the base station and so protect against false base stations, a system is provided where certain authentication credentials are pre-fetched while connection to the SIM card and the authentication subsystem of the wide area mobile network are in signaling connection. These advance credentials are then presented by the devices in authentication requests without requiring access via the mobile network or the connected presence of the SIM card being necessary for successful authentication.

10 Claims, 3 Drawing Sheets

(58) Field of Classification Search
USPC .......................................................... 726/3–7
See application file for complete search history.

(56) References Cited

U.S. PATENT DOCUMENTS

| | | | | |
|---|---|---|---|---|
| 7,716,723 | B1* | 5/2010 | Taylor | H04L 63/08 380/273 |
| 7,895,334 | B1* | 2/2011 | Tu | H04L 63/0272 709/227 |
| 2005/0108534 | A1* | 5/2005 | Bajikar | G06F 21/606 713/172 |
| 2005/0124288 | A1* | 6/2005 | Karmi | H04L 12/5692 455/3.01 |
| 2005/0283444 | A1* | 12/2005 | Ekberg | G06Q 20/02 705/67 |
| 2006/0291455 | A1* | 12/2006 | Katz | H04L 29/06 370/355 |
| 2007/0022469 | A1* | 1/2007 | Cooper | H04K 1/00 726/3 |
| 2008/0065892 | A1* | 3/2008 | Bailey | H04L 63/0492 713/171 |
| 2009/0254974 | A1* | 10/2009 | McGregor | H04W 4/003 726/3 |
| 2010/0106920 | A1* | 4/2010 | Anckaert | G06F 21/79 711/154 |
| 2010/0130166 | A1* | 5/2010 | Tsuria | G06F 21/35 455/411 |
| 2010/0142499 | A1* | 6/2010 | Zhang | H04L 63/08 370/338 |
| 2011/0151836 | A1* | 6/2011 | Dadu | H04L 63/0853 455/411 |
| 2012/0284785 | A1* | 11/2012 | Salkintzis | G06F 21/43 726/7 |
| 2014/0059640 | A9* | 2/2014 | Raleigh | H04W 24/10 726/1 |
| 2014/0150063 | A1* | 5/2014 | Bone | H04L 63/18 726/3 |
| 2014/0181902 | A1* | 6/2014 | Bone | H04L 63/0853 726/3 |

* cited by examiner

AUTHENTICATION IN A WIRELESS ACCESS NETWORK

CROSS REFERENCE TO RELATED APPLICATIONS

This application is a U.S. Nationalization of International Application Number PCT/GB2011/051721, filed on Sep. 14, 2011, which claims priority to United Kingdom Patent Application No. 1015322.9, filed on Sep. 14, 2010 and United Kingdom Patent Application No. 1015323.7, filed on Sep. 14, 2010, the entireties of which are incorporated herein by reference.

FIELD OF THE INVENTION

The invention relates to a method for authenticating devices to a wireless access network. In particular, the invention relates to a method for facilitating authentication of mobile devices where those devices temporarily lack a connection to an authentication storage means.

BACKGROUND TO THE INVENTION

Mobile telecommunications devices typically require a continuous connection to an authentication storage means (for instance a UICC, SIM card or USIM card). Without this connection, the mobile telecommunications device will be capable of establishing only emergency calls. The connection, while typically by virtue of a SIM card installed in a SIM interface, may also be implemented by connecting via another device in Bluetooth range with a suitable SIM access profile.

In particular, such a connection will be required to allow the device to obtain the RES and associated key material (Kc or CK∥IK) necessary for authentication to take place between the device and the network.

Such devices may additionally be able to authenticate to a heterogeneous access network (such as a WiFi Hotspot) using non-SIM means. The authentication subsystem used by a non-cellular telecommunications network may be shared with the conventional authentication subsystem of a cellular subsystem, such as the AAA server.

However, in the absence of a connection to a suitable authentication storage means the device will also be incapable of authenticating the base station in GSM.

There is therefore a requirement for a facility that allows devices to authenticate to a wide area mobile network (or heterogeneous access network) when they temporarily do not have a connection to a SIM card.

There may be a further requirement to authenticate the base station and so protect against false base stations.

As a consequence of the decreasing costs of wireless telecommunications apparatus, tighter safety and climate regulation and vigorous market competition, an ever increasing number of devices ("machines") are being provided with wireless telecommunications apparatus to facilitate additional information services. A particular driving factor in this trend has been the provision of wireless services to so-called machine to machine (M2M) solutions.

The term "M2M" has been used to describe applications in such diverse fields as: tracking and tracing; payment; remote maintenance; automotive and electronic toll; metering; and consumer devices. The augmentation of M2M to allow wireless communications between devices (often referred to as mobile M2M) makes new services possible in some cases (within the automotive industry, for instance) and in others extends existing M2M services (within the field of smart metering).

With mobile M2M, machines numbering in the order of millions and located anywhere within mobile network coverage, can be simultaneously monitored to provide real-time information that an individual or enterprise can analyze and act upon.

It is predicted that large numbers of "machines" will require access to wide-area mobile networks (such as the GSM, GPRS and/or 3G cellular networks). Each of these machines may only require authentication very occasionally but may have all the basic equipment to allow connection to at least one access network when that is required. However, just requiring that each device be allowed to authenticate itself to the network from time to time, may undermine the benefits of certain mobile M2M services (particularly those services that are predicated on a low cost machine/service).

It has been suggested in, U.S. Pat. No. 9,271,148. that to address this issue multiple devices may use the same, common (U)SIM card for authentication. As a result, there may be many devices/machines having equipment suitable for establishing a connection with one or more wireless access networks but lacking a continuous connection with an authentication storage means necessary for authenticating the device with the selected access network.

It is therefore an object of the invention to obviate or at least mitigate the aforementioned problems.

In accordance with one aspect of the present invention, there is provided a system for facilitating authentication over a wireless access network, the system comprising:

an authentication storage means, which is operable to provide authentication information during an authentication process;

at least one machine device being operable to connect to a wireless access network and having a communication interface with the authentication storage means;

a core network, which is operable to provide a machine device with advance data to be communicated to the authentication storage means to facilitate subsequent authentication of the said machine device with an access network.

In a further aspect of the present invention, there is provided a method for facilitating authentication at least one machine device over one or more wireless access networks, the at least one machine device having an associated authentication storage means, the method comprising: providing the machine device with advance data while the machine device and authentication storage means are in signaling connection with the wireless access network; and subsequently, authenticating said machine device with a core network of the wireless access network in accordance with said advance data while the machine device is in signaling connection with the core network, neither access via the wireless access network nor the connected presence of the authentication storage means being necessary for said authentication.

BRIEF DESCRIPTION OF THE DRAWINGS

For a better understanding of the present invention, reference will now be made, by way of example only, to the accompanying drawings in which.

DETAILED DESCRIPTION

The invention thus addresses the requirements of a facility that both allows devices to authenticate to a wide area mobile network (or heterogeneous access network) when they temporarily do not have a connection to a SIM card and to authenticate the base station and so protect against false base stations. It does so by pre-fetching certain authentication information while (or whenever) a suitable connection to the SIM and access network is available.

Figure 1:
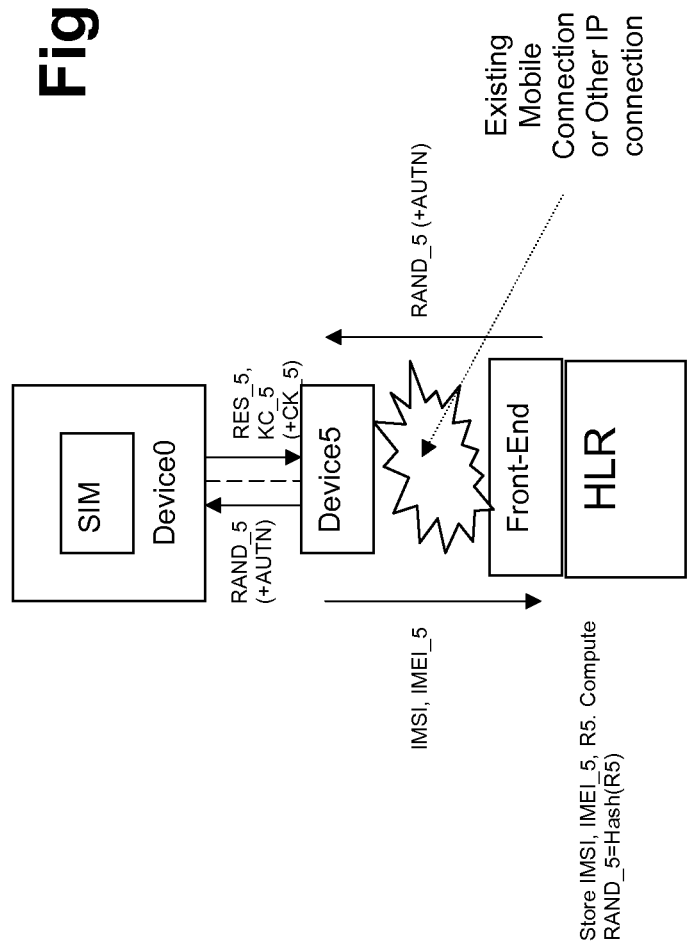
FIG. 1 illustrates the prefetch operation in accordance with a first embodiment of the present invention.
Figure 2:
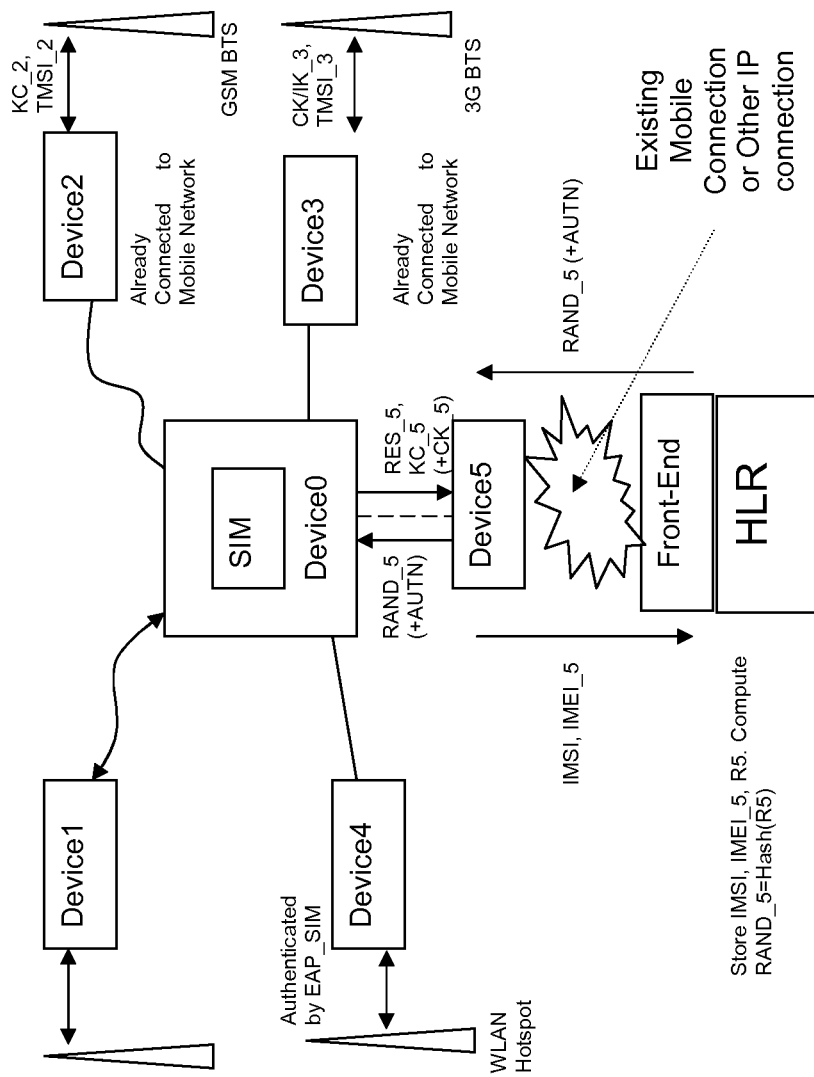
FIG. 2 illustrates the prefetch operation in accordance with a second embodiment of the present invention.
Figure 3:
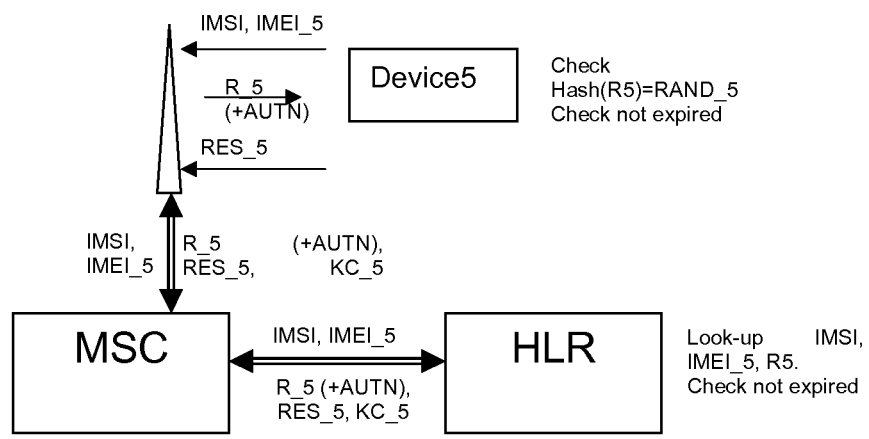
FIG. 3 illustrates the connection operation in accordance with the present invention.

As illustrated in FIGS. 1 and 2, while the device does have a connection to both the SIM, and any access network, it "pre-fetches" a RAND from the HLR. (Or for a USIM it pre-fetches a RAND and corresponding AUTN). It then relays the RAND to the (U)SIM, and retrieves and stores the corresponding RES and key material (Kc or CK∥IK).

At an authentication challenge, the challenging node (base station or RNC or MME) obtains a matching authentication vector from the HLR (triplet, quintuplet or quadruplet), and the challenged device can immediately respond. There is a risk here of false base station (e.g. since the RAND+AUTN has already been retrieved it might have been exposed). There is a further risk that the corresponding RES and key material may be hacked from the pre-fetching device before being used to authenticate.

There are several protections

1. The HLR does not actually provide the RAND to the challenging node (base station etc.) but rather a hash pre-image of RAND (e.g. something R with Hash(R)=RAND). The device can recognize the correctness of the pre-image by hashing it, and since the corresponding R is unknown outside the HLR, the challenging node must have fetched it from the HLR, so is probably a valid base station. While the preceding discussion relates to 3G, this also works for GSM.

2. The HLR imposes a "time out". If there is no matching request for an authentication vector within a time-out of the previous "pre-fetch" then the HLR discards the pre-fetch and the associated R.

3. The HLR uses any form of device authentication to ensure that the pre-fetching device is entitled to pre-fetch for the corresponding IMSI and is sufficiently robust. This can be achieved by establishing a suitable stack over the current access network, and running—say—client-authenticated TLS, PSK-authenticated TLS, or an EAP method between the device and a "front-end" to the HLR. The device can then be authenticated by certificate, pre-shared key or password, or "contextual" information (e.g. declared IMEI and TMSI and some log of recent connection attempts that this device has made). The HLR can verify that the device is "entitled" to pre-fetch for the IMSI concerned e.g. because it is currently connected to the network with a matching TMSI. The HLR can also verify that the device is sufficiently robust, and there is minimal risk of leaking the pre-fetched material. This might be done using device attestation as well as authentication.

There is one further variant. If the HLR is sufficiently convinced as to device robustness, or there is sufficiently low risk of fraud (data-only subscription, severe limits on volume/value of data) then the HLR can provide a complete pre-fetched authentication vector to the device, obviating the need for the device to establish a connection to a corresponding SIM card. This will allow a form of SIM-less authentication, but without a major re-design of existing networks. This last embodiment will require new features that are applied only at the HLR and corresponding front-end.

In the case of systems as described in, U.S. Pat. No. 9,271,148. where multiple devices use the same, common (U)SIM card for authentication, the same network adaptations as above will be needed to support "multiple devices per (U)SIM". However, HLR will need a pre-fetch record per IMEI (i.e. per unique terminal), and if IMEI is not presented between MSC and HLR then each device must present a different IMSI offset (e.g. IMSI_5=IMSI_0+5).

The front-end can enforce various authentication techniques on the device (e.g. certificate, pre-shared key, contextual), while the HLR can enforce any time-out policy. Any distinction between R5 and RAND_5 is optional.

The invention claimed is:

1. A system having one or more entities, each entity having a processor and physical storage for facilitating authentication of at least one machine device with a wireless access network, the system comprising:
   a physical authentication storage device, that provides authentication information to other entities of the system during authentication processes;
   at least one machine device connected to a wireless access network and having a communication interface with the authentication storage device, such that the at least one machine device has a non-continuous connection with the authentication storage device, the authentication storage device providing the authentication information to the at least one machine device while connected to the at least one machine device, the authentication information including a hash pre-image of a random value, the hash pre-image allowing the machine device to determine the correctness of the pre-image by hashing the pre-image random value, and further allows the machine device to determine that the pre-image was issued by a valid base station; and
   a core network, that provides the at least one machine device with advance data, where the advance data is used by the one least one machine device to obtain the authentication information from the authentication storage device in advance of a subsequent authentication process of the said at least one machine device with the wireless access network, the subsequent authentication process occurring when the at least one machine device is not connected to the authentication storage device such that the subsequent authentication process is not dependent upon the at least one machine device having a current connection with the authentication storage device.

2. A system as claimed in claim 1, wherein the advance data is communicated to the authentication storage device while the authentication storage device is in signaling connection with the wireless access network.

3. A system as claimed in claim 2, further including a challenging node that is used by the at least one machine device to connect to the wireless access network, the challenging node being in signaling communication with the wireless access network, the challenging node:
   obtaining authentication vectors for the at least one machine device; and
   comparing the authentication vectors obtained with advance data presented by the at least one machine device.

4. A system as claimed in claim 3, wherein the authentication vectors obtained by the challenge node include a substantially random number uniquely assigned to the at least one machine device and matching a substantially random number included within the advance data.

5. A system as claimed in claim 3, wherein the authentication vectors obtained by the challenge node include a hash of a substantially random number uniquely assigned to the at least one machine device and matching a substantially random number included within the advance data, the system further including a device for generating a hash of a substantially random number included within the advance data.

6. A method for facilitating authentication at least one machine device over one or more wireless access networks, the at least one machine device being associated with an authentication storage means via a non-continuous connection, the method comprising:
   providing the at least one machine device with advance data while the at least one machine device is in signaling connection with the wireless access network;
   having the at least one machine device use the advance data to obtain authentication information form the authentication storage means in advance of an authentication process with a core network of the wireless access network, the authentication storage means providing the authentication information to the at least one device while connected to the at least one machine device, the authentication information including a hash pre-image of a random value, the hash pre-image allowing the machine device to determine the correctness of the pre-image by hashing the pre-image random value, and further allows the machine device to determine that the pre-image was issued by a valid base station; and
   subsequently, authenticating said at least one machine device with the core network of the wireless access network, such that the subsequent authentication is not dependent upon the at least one machine device having a current connection with the authentication storage means, the subsequent authentication occurring when the at least one machine device is not connected to the authentication storage.

7. A method as claimed in claim 6, further including communicating the advance data to the authentication storage means while the authentication storage means is in signaling connection with the wireless access network.

8. A method as claimed in claim 7, further including the at least one machine device connecting to the wireless access network via a challenging node the challenging node:
   being in signaling communication with the wireless access network;
   obtaining authentication vectors for the at least one machine device; and
   comparing the authentication vectors obtained with advance presented by the at least one machine device.

9. A method as claimed in claim 8, wherein the authentication vectors obtained by the challenging node include a substantially random number uniquely assigned to the at least one machine device, the method further comprising:
   matching a substantially random number included in the advance data.

10. A method as claimed in claim 8, wherein the authentication vectors obtained by the challenging node include a hash of a substantially random number uniquely assigned to the at least one machine device, the method further comprising:
   matching a substantially random number included in the advance data; and
   generating a hash of a substantially random number included within the advance data.

* * * * *